United States Patent
Rupp et al.

(10) Patent No.: US 6,803,689 B2
(45) Date of Patent: Oct. 12, 2004

(54) STATOR

(75) Inventors: Bernhard Rupp, Sulzfeld (DE); Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/130,113

(22) PCT Filed: Aug. 25, 2001

(86) PCT No.: PCT/DE01/03257
§ 371 (c)(1),
(2), (4) Date: Aug. 5, 2002

(87) PCT Pub. No.: WO02/23698
PCT Pub. Date: Mar. 21, 2002

(65) Prior Publication Data
US 2003/0020347 A1 Jan. 30, 2003

(30) Foreign Application Priority Data
Sep. 15, 2000 (DE) .......................... 100 45 760

(51) Int. Cl.⁷ ................................................ H02K 5/00
(52) U.S. Cl. .......................................... 310/91; 310/43
(58) Field of Search ........................... 310/91, 43, 235, 310/260, 270, 215

(56) References Cited

U.S. PATENT DOCUMENTS

| | | | |
|---|---|---|---|
| 3,768,152 A | | 10/1973 | Leonard et al. ............... 29/596 |
| 4,336,470 A | * | 6/1982 | Gutris .......................... 310/42 |
| 4,701,654 A | | 10/1987 | Tatukawa et al. ........... 310/153 |
| 4,818,911 A | * | 4/1989 | Taguchi et al. ............. 310/259 |
| 5,089,730 A | | 2/1992 | O'Connor et al. ............. 310/51 |
| 5,397,954 A | * | 3/1995 | Besson ....................... 310/260 |
| 5,705,874 A | * | 1/1998 | Grudl ......................... 310/216 |
| 6,166,468 A | * | 12/2000 | Suzuki et al. ................. 310/90 |

FOREIGN PATENT DOCUMENTS

| | | | |
|---|---|---|---|
| DE | 928 782 C | 6/1955 | |
| DE | 11 18 342 B | 4/1960 | |
| EP | 0 871 282 A | 10/1998 | .......... H02K/15/02 |
| EP | 0 980 132 A | 2/2000 | ............ H02K/9/22 |
| GB | 905148 | 9/1982 | |

* cited by examiner

Primary Examiner—Dang Le
Assistant Examiner—Nguyen Hanh
(74) Attorney, Agent, or Firm—Ronald E. Greigg

(57) ABSTRACT

A stator according to the invention has an elastoplastic element, which is disposed between the winding and the pole cog and which secures the winding firmly to the pole cog, thus preventing vibrations.

3 Claims, 4 Drawing Sheets

STATOR

CROSS-REFERENCE TO RELATED APPLICATIONS

This application is a 35 U.S.C. 371 application of PCT/DE 01/03257, filed on Aug. 25, 2001.

BACKGROUND OF THE INVENTION

1. Field of the Invention

The invention is directed to an improved lamination packet including at least one pole cog and at least one winding disposed on one of the pole cogs.

2. Description of the Prior Art

U.S. Pat. No. 5,089,730 has disclosed a stator in which the coils are wound onto a coil body in advance and the coil body is slid onto a stator pole cog and is fastened by means of an additional ring element. An undesirable play between the coil support and the ring element leads to microvibrations of the system and damage to the connections between the coils and an external circuit of the coils.

In addition, a thermal flux between the winding and the stator pole cog is very poor.

EP 0 205 090 A2 has disclosed a rotor in which an annular retainer element encloses magnets and holds them in a support body by exerting axial and radial force. The retainer element must be fastened into the support body or else no force is exerted.

A coil support can also be fastened by a snapping-in of the coil support by means of recesses embodied for this purpose in the cogs and associated snap elements provided in the coil bodies. With a fastening of this kind, a relatively stable coil body must be provided for each coil. In addition, a thermal flux and temperature compensation between the winding and a lamination bundle is also hindered here. With this method, it is also very difficult to assure a reliable play compensation of the reciprocal position of the lamination bundle and coil completely and in all degrees of freedom, particularly when a very broad operating temperature range from −40 to +180° C. is required.

SUMMARY OF THE INVENTION

The stator according to the invention has the advantage over the prior art that a winding is fastened to a lamination bundle in a simple manner and a thermal flux between the winding and lamination bundle is increased.

It is advantageous if the stator has a spring ring, which exerts an outwardly directed radial force on an elastoplastic element, which is disposed between the pole cog and the winding, because as a result, the elastoplastic element is secured in a gap between the pole gear and the winding, and the spring ring presses the element into the gap.

It is advantageous if the spring ring and the elastoplastic element constitute a snap connection so that the spring ring cannot slide.

If the elastoplastic element is advantageously disposed on a support body, it is advantageous if the support body has through openings for the connecting lines of the stator winding because this allows the connecting lines to be easily connected to a connection grid.

BRIEF DESCRIPTION OF THE DRAWINGS

Exemplary embodiments of the invention are described herein below, with reference to the drawings, in which.

DESCRIPTION OF THE PREFERRED EMBODIMENTS

Figure 1A:
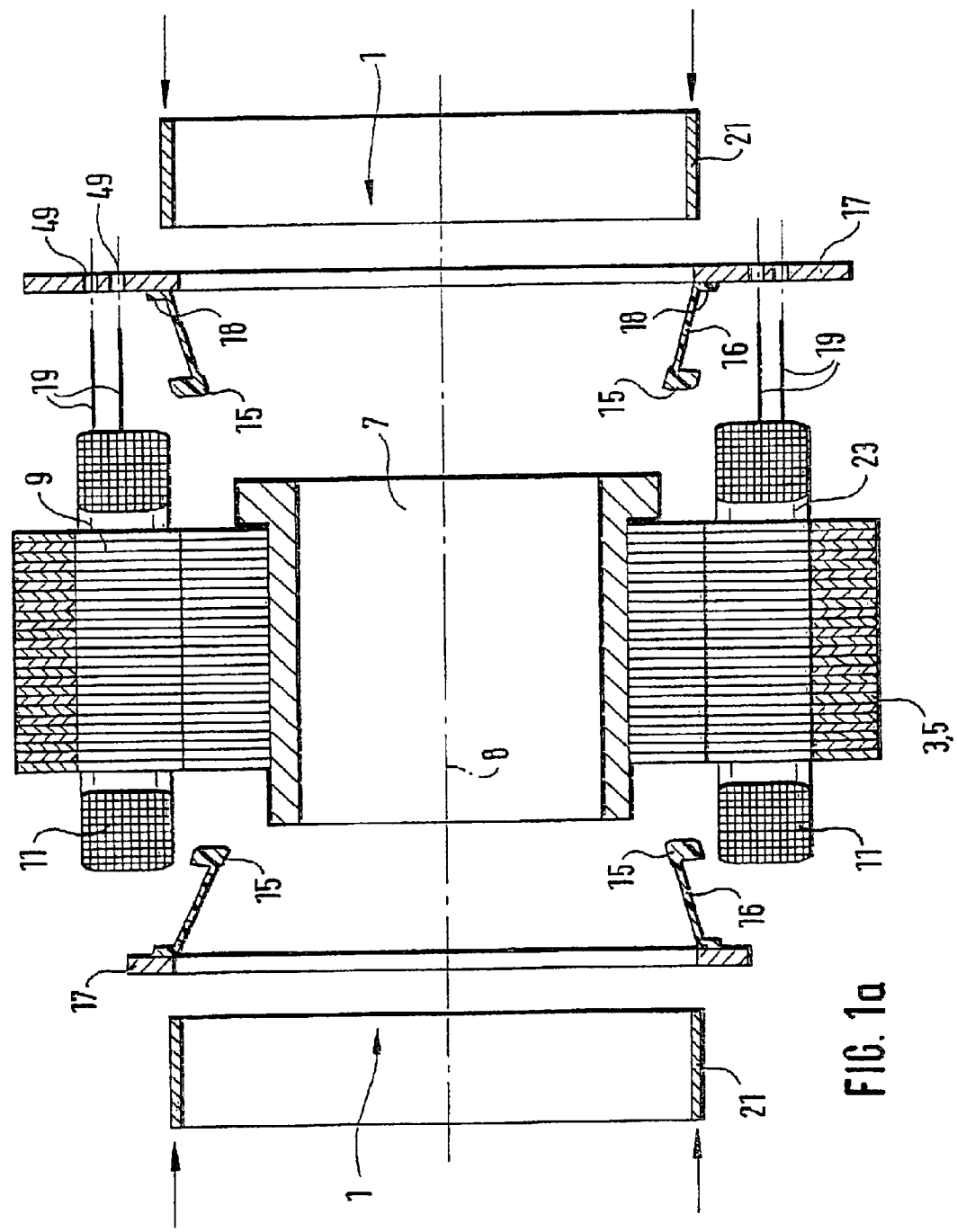
FIGS. 1a, and 1b show a first exemplary embodiment of a stator embodied according to the invention, when not installed and when installed.

FIG. 1a shows parts of an electric motor, for example an electrically switched reluctance machine. The electric motor is comprised, among other things, of a stator including a lamination packet and an internal rotor for example. The stator and the rotor 7 have, for example, a common central axis 8, which can also be a symmetry axis.

The lamination packet 5 has at least one pole cog 9, on which at least one electrical winding 11 is disposed. The electrical winding 11, for example, is a coil of self-bonding wire or is wound onto a winding body.

An elastoplastic element 15 is fastened oriented toward the rotor 7, between the pole cog 9 and the winding 11 so that the winding 11 is fixed to the pole cog 9. The elastoplastic element 15 compensates for a play between the lamination packet 5 and the winding 11. For example, the elastoplastic element 15 is made of rubber, plastic, an electrically insulating material, or an easily deformable alloy coated with insulating material, i.e. it can be deformed in an exclusively elastic manner, an exclusively plastic manner, or both elastically and plastically. Through a wedge-shaped embodiment of the elastoplastic element 15, the element 15 can adapt to any different size of gap 23 between the pole cog 9 and the winding 11. An element 15 of this kind in the form of a wedge can be inserted as a separate part into the gap 23 or else all of the elements 15 are connected, for example, to a support body 17, which is embodied in the form of a ring, for example. For each pole cog 9 and winding 11, for example two elements 15 are used, i.e. the winding 11 is disposed on the pole cog 9 centrally in relation to the pole cog 9 and two opposing gaps 23 are produced per pole cog 9.

In addition, for example a spring ring 21 can be used to secure the elastoplastic element 15 in the gap 23 between the stator pole cog 9 and the winding 11.

The at least one elastoplastic element 15 is disposed, for example, on at least one support body 17. Two support bodies 17 are used for the stator 3 in this exemplary embodiment. The elastoplastic element 15 in this instance has an extension arm 16, which connects it to the support body 17. At the one end of the extension arm 16, there is a projection 18, which encompasses the winding 11 (FIG. 1b).

Through openings 49 for connecting wires 19 of the winding 11 are provided in the support body 17. The support body 17 contains, for example, a stamped grid (not shown) or is the stamped grid for the connecting wires 19, which is correspondingly electrically connected, for example, to a set of control electronics (not shown) of a switched reluctance machine. If the stamped grid at the same time supports the control electronics, then the power electronic components are also fastened and electrically connected there in a corresponding fashion.

The spring ring 21 can also be used, for example, to secure the elastoplastic element 15 in the gap 23 between the stator pole cog 9 and the winding 11.

Figure 1B:
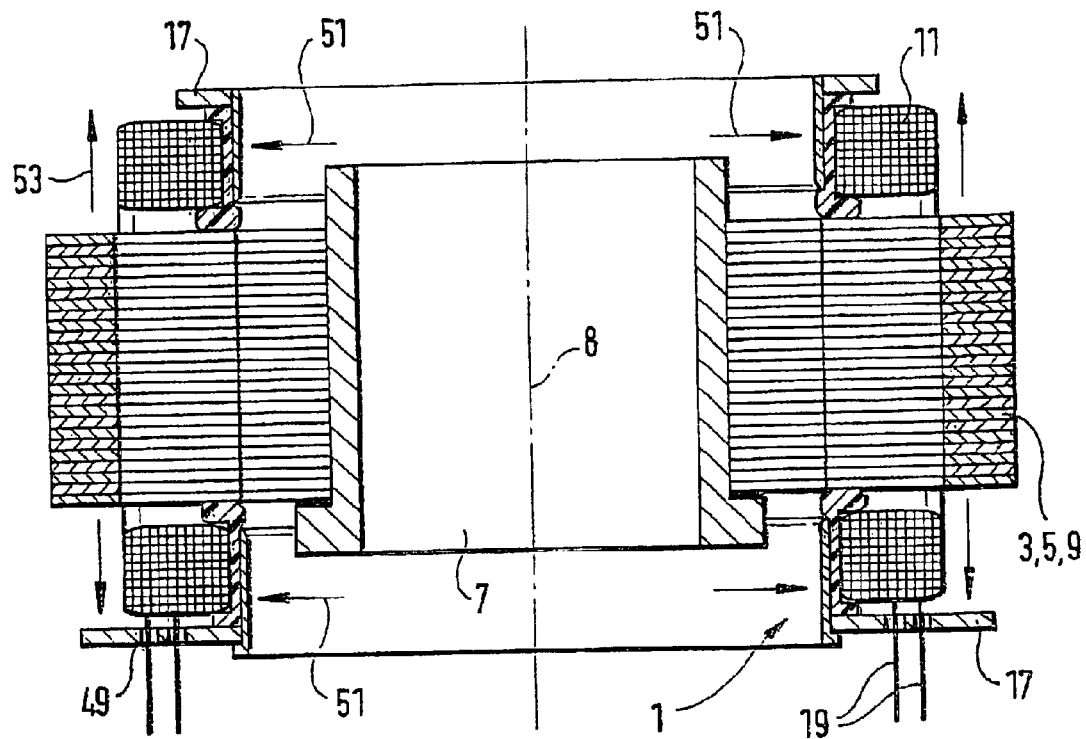

FIG. 1b shows the stator 3 when installed. For example, the installation is carried out as follows: The individual windings 11 are mounted onto the pole cogs 9 centrally in relation to each pole cog 9. This produces two gaps 23 on the lamination packet 5, on axially opposite sides of the lamination packet 5, and an elastoplastic element 15 is respectively inserted, with or without a support body 17, into each of these gaps 23.

Then the spring ring 21 is first compressed in the radial direction so that it can be inserted axially into the inner space formed by the lamination packet 5. After the force is withdrawn, the spring ring 21 expands and the spring ring 21 exerts an outwardly directed radial force 51, indicated by arrows, against the elastoplastic element 15. As a result, the element 15 is wedged into the gap 23 and exerts an outwardly directed axial force 53, indicated by arrows, on the winding 11.

Figure 2:
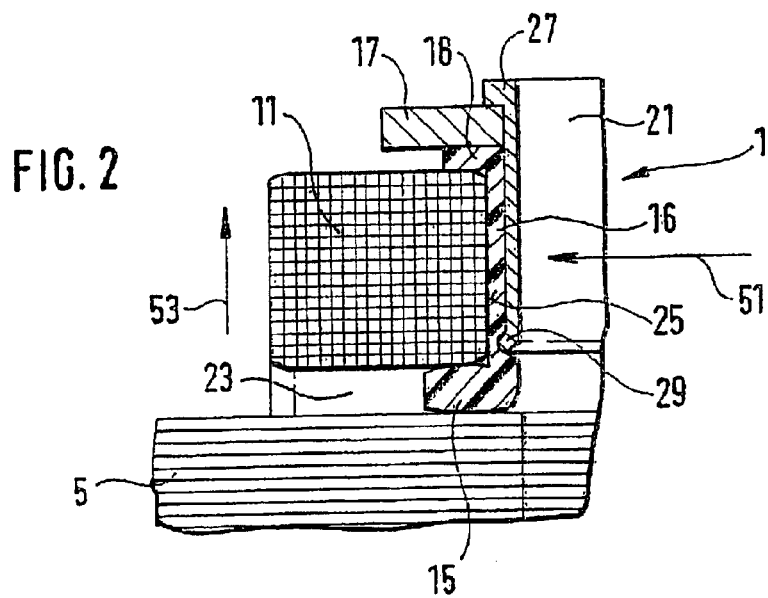
FIG. 2 shows an arrangement of the spring ring and the elastoplastic element.

FIG. 2 shows a particularly advantageous embodiment of the stator 3. The element 15 is disposed on a support body 17. A projection 18, which is disposed on the end of the extension arm 16 opposite from the element 15, encompasses the winding 11. In its composition and shape, the projection 18 is embodied in the same way as the elastoplastic element 15, for example. The extension arm 16 at least partially covers an inside 25 of the winding 11, which is oriented toward the rotor 7. The spring ring 21 encompasses the support body 17 with a second projection 27. In addition, the elastoplastic element 15 and the spring ring 21 are embodied so that they constitute a kind of snap connection 29 in the vicinity of the gap 23 so that the spring ring 21 cannot slide.

Figure 3A:
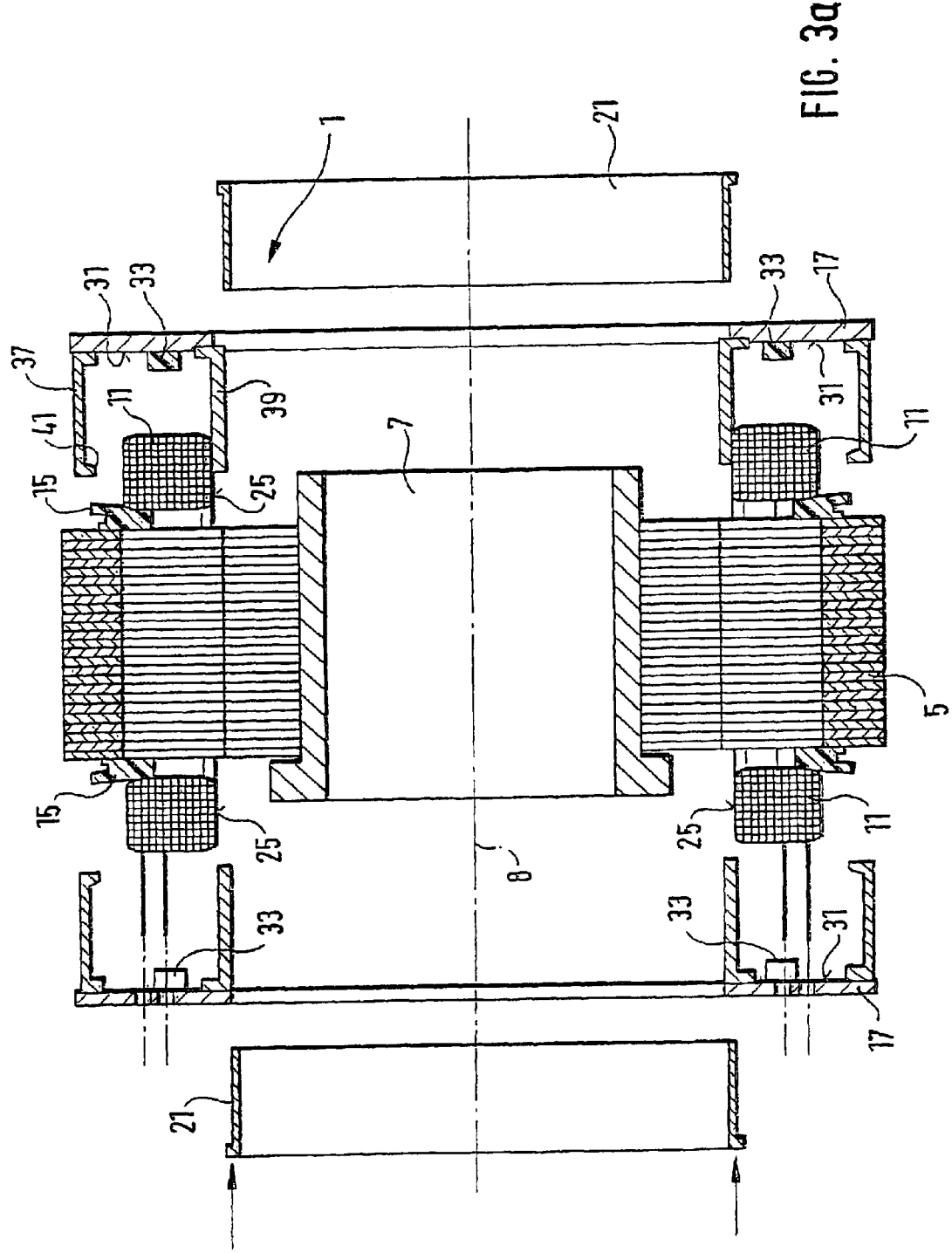
FIGS. 3a, and 3b show another exemplary embodiment of a stator embodied according to the invention, when not installed and when installed.

FIG. 3a shows another exemplary embodiment of the stator 3 according to the invention.

The element 15 is disposed in the gap 23 on a side remote from the rotor 7. In addition, at least one support body 17 is required, which is designed as follows. On a support body inside 31, which is disposed axially opposite the lamination packet 5, the support body 17 has a second spring element 33 and has at least one first arm 37 and at least one second arm 39, which extend axially and thus constitute a U-shape.

For assembly, the support body 17 is slid axially onto the winding 11 (parallel to the center axis 8). Then the second arm 39 rests against the inside 25 of the winding 11 and the second spring element 33 rests against the outside of the winding 11, opposite from the support body inside 31. At its end, the first arm 37 has a hook 41, which can encompass the elastic element 15 and can thus exert a force 53 axially outward on the element 15 and the winding 11, which fastens the winding 11 to the pole cog 9. Likewise, the spring ring 21, as previously explained, is slid into the inner space, as a result of which the second arm 39 is pressed firmly against the winding 11 and thus secures the support body 17 firmly in position by means of an outwardly directed radial force 51. The winding 11 rests radially against the lamination packet.

Figure 3B:
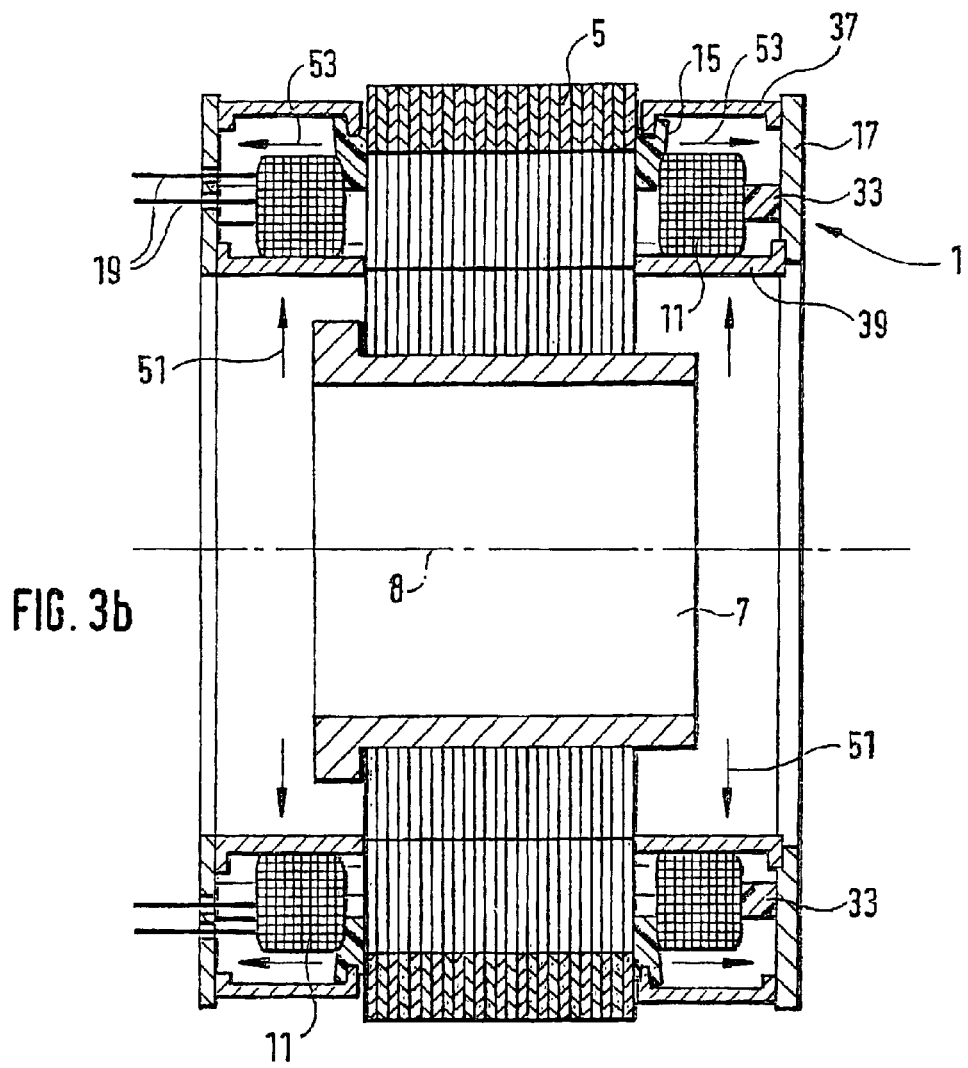

FIG. 3b shows the stator 3 when installed. The second arm 39 rests against the inside 25.

During installation, the second spring element 33 is at least partially compressed axially until the hook 41 encompasses the element 15. Then the force on the second spring element 33 and the support body 17 is at least partially withdrawn and the spring ring 21 is installed so that the support body 17 remains fixed in its position. The second spring element 33 then rests against the winding 11 and exerts an outwardly directed axial force on the support body 17 so that the first arm 37 engages the elastoplastic element 15 and extends outward in an axial direction 53. As a result, the winding 11 is also calked in relation to the lamination packet 5.

Figure 4:
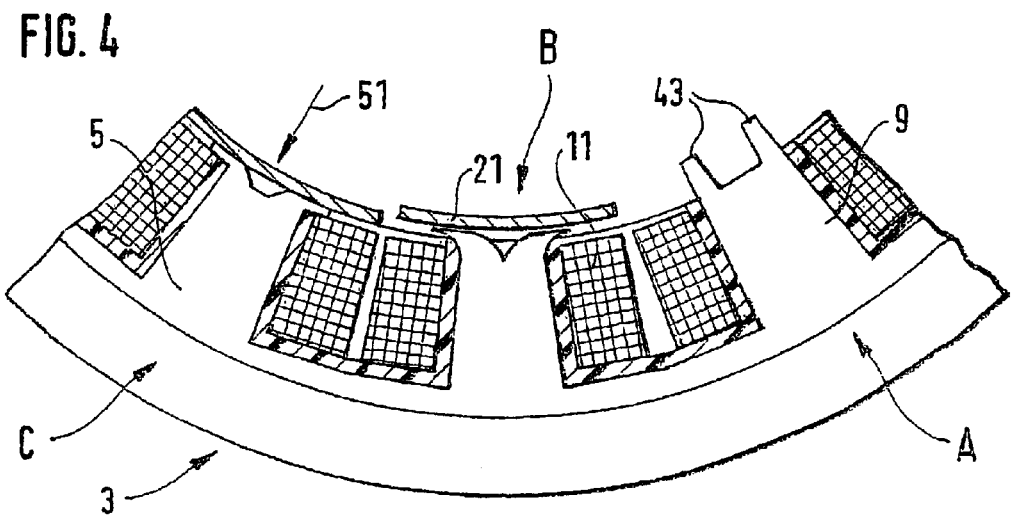
FIG. 4 shows another exemplary embodiment of a stator embodied according to the invention.

FIG. 4 shows another exemplary embodiment of the stator 3 according to the invention.

At its free radial end, the pole cog 9 has at least two radially inward-protruding nubs 43, which can flex elastically and/or plastically (position A) and constitute an elastoplastic element 15. The nubs 43 are, for example, embodied of one piece with the lamination packet 5. In order to fasten the winding 11 onto the stator pole cog 9, the spring ring 21 is inserted, which bends the nubs 43 apart from one another (position B) so that the bent-over nubs 43 are pressed against the winding 11 (51) and fasten it to the lamination packet 5 (position C). This compensates for the respective play between the individual winding 11 and the associated pole cog 9.

These arrangements of windings 11 on a pole cog 9 at least partially permit a direct contact between the winding 11 and the lamination packet 5 so that this lamination packet can be used as a cooling body for the winding 11. A winding body does not have to have high mechanical strength so that it can be embodied as thin and thus permits a favorable heat exchange.

The foregoing relates to preferred exemplary embodiments of the invention, it being understood that other variants and embodiments are possible within the spirit and scope of the invention, the latter being defined by the appended claims.

What is claimed is:

1. A stator (3) for an electric motor, comprising
    a lamination packet (5), the lamination packet (5) including of at least one pole cog (9) and at least one winding (11), which is disposed on one of the pole cogs (9),
    at least one elastoplastic element (15) disposed between the winding (11) and the pole cog (9),
    at least one spring ring (21), the spring ring exerting a radial force (51) on the elastoplastic element (15),
    at least one support body (17),
    the at least one spring ring (21) exerts a radial force (51) on the support body (17), and
    wherein the support body (17) is U-shaped, that the support body (17) has at least one first arm (37), which engages the elastoplastic element (15), that the support body (17) has at least one second arm (39), which rests against the lamination packet (5) and is engaged by the spring ring (21).

2. A stator (3) for an electric motor, comprising
    a lamination packet (5), the lamination packet (5) including of at least one pole cog (9), at least one winding (11), which is disposed on one of the pole cogs (9), the pole cog (9) having at least one elastoplastic element (15), at least one spring ring (21), the spring ring exerting a radial force (51) on the elastoplastic element (15), wherein the pole cog (9) has at least two nubs (43), and wherein the spring ring (21) presses the nubs (43) against the winding (11).

3. The stator according to claim 2, wherein the winding (11) is wound on a winding body.

* * * * *